J. SHAW.
Wheel Cultivator.
No. 16,401.  Patented Jan. 13, 1857.
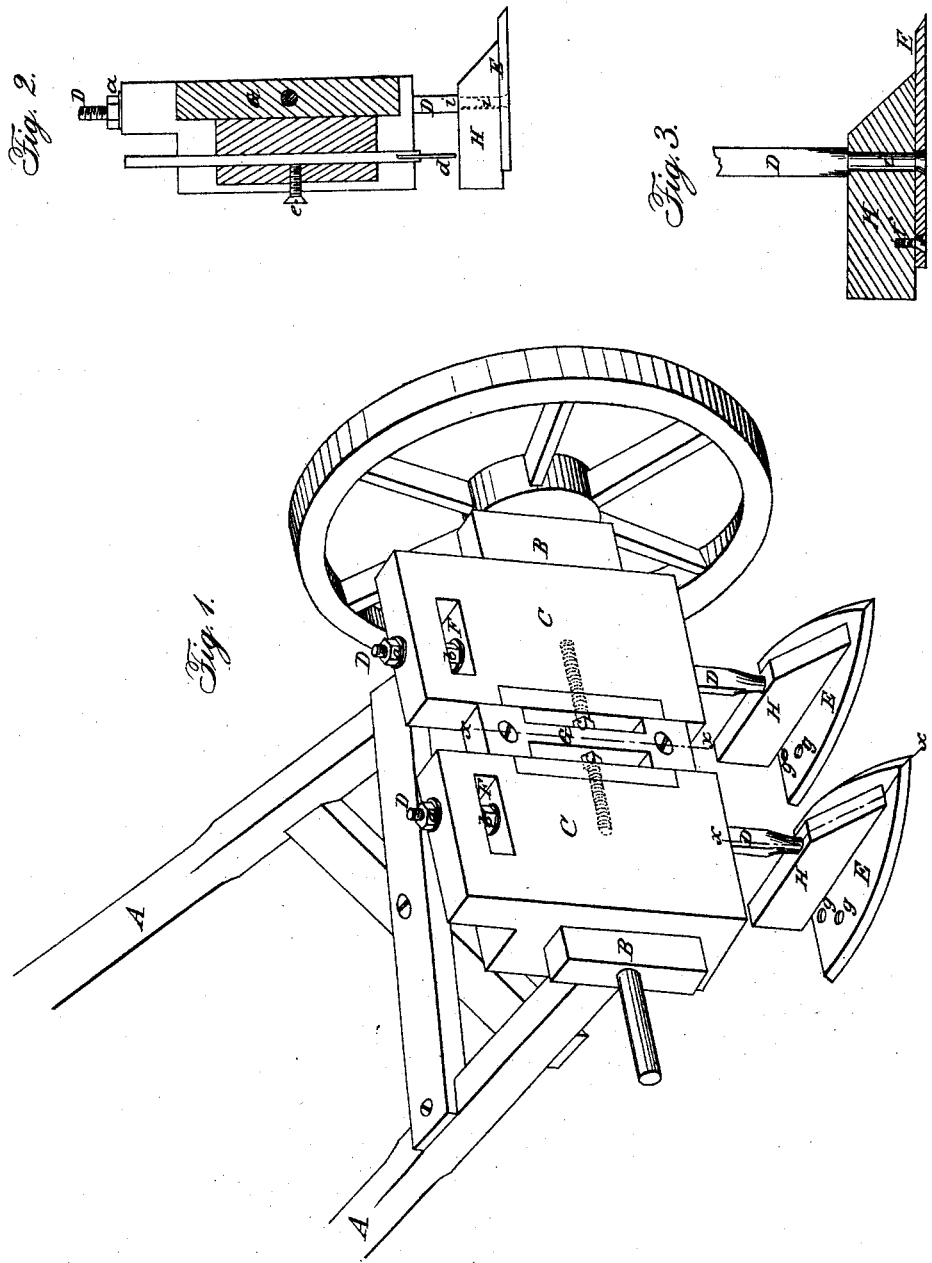

UNITED STATES PATENT OFFICE.

JOSEPH SHAW, OF RICHLAND, GEORGIA.

IMPROVEMENT IN COTTON-CULTIVATORS.

Specification forming part of Letters Patent No. 16,401, dated January 13, 1857.

*To all whom it may concern:*

Be it known that I, JOSEPH SHAW, of Richland, in the county of Stewart and State of Georgia, have invented certain new and useful Improvements in Cultivators, which I term "a Cotton Weeder or Hoe;" and I do hereby declare the following to be a full, clear, and exact description of the same, reference being had to the accompanying drawings, making a part thereof, in which—

Figure 1 represents the machine in question with one wheel removed to show the parts behind it. Fig. 2 represents a vertical section through the machine at the red line *x x* of Fig. 1, and Fig. 3 represents a similar vertical section at the red line * * of Fig. 1.

Similar letters of reference, where they occur in the several figures, denote like parts of the machine in all.

To enable others skilled in the art to make and use my invention, I will proceed to describe the same with reference to the drawings.

The cultivators or hoes are supported in a frame which rests in two wheels, upon which it is drawn over the ground. Attached to the rear of the frame are two handles, A A, by which the machine is guided. The tongue, pole, or other contrivance to which the horses are attached, and by which the cultivator or hoe is drawn, may be of any of the ordinary kinds, are not represented in the drawing.

On the axle B of the machine are arranged two blocks, C C, through which vertically pass the shanks D D, that are permanently united at their lower ends to the hoes E E. The upper ends of the shanks D have screw-threads formed upon them, upon which the nuts *a b* run, so that said shanks, with their hoes, may be adjusted and held in adjustment at any proper height, proper mortises F being cut or formed horizontally through the blocks C, so as to work the lower nuts, *b*, with facility. The blocks C C are made to move in or out on the axle B, so as to adjust the hoes laterally to the hills or rows of cotton, as follows: G is a permanent frame centrally arranged on the axle B, and the blocks C C are placed one on each side of this central piece, G. A square bar, *c*, with screw-threads cut upon each of its ends, as shown in dotted lines in Fig. 1, which take into female screws cut or formed in the blocks C C, is supported so as to turn in the central piece, G. Now, by applying a wrench to the square portions of the bar and turning it around, the blocks carrying the hoes are made to advance toward or recede from each other to give the proper distance or space between the hoes. On the rear of the frame (see Fig. 2) is arranged so as to be adjustable by a set-screw, *e*, an indicator or marker, *d*, so that the operator, as he walks in rear of the machine, may select such plants as he wishes to leave standing, and by guiding the machine so that the marker *d* passes over such plant or plants they will be untouched, while the hoes will cut down or turn out or over all the other plants, weeds, &c.

Above the hoes E are arranged the shoes H H, respectively, so that, if not otherwise controlled, they would freely turn upon the rounded portions *i i* of the shanks D, which pass through them; but a series of holes, *g g*, are made in the hoes E, through which a screw, *f*, Fig. 3, passes into the said shoes and holds them at any desired inclination in regard to the hoes. These shoes H serve as mold-boards for throwing the earth more toward or from the plants, as may be desired, and are particularly useful on side-hill cultivation, as they can be so set that the one on the lower side of the plants shall throw up more earth and the upper one less, and thus "hill up" the plants with more uniformity. When the machine is properly adjusted it will leave standing and cultivate the selected plants and remove all others, and is equally adapted to side hills as level ground.

I have shown but a single pair of hoes on the machine; but double sets may be used of course. This, however, is mere duplication of parts, and could not be considered as invention.

The marker *d* should be of flexible leather or cloth, so that in touching the plants it should not break or injure them.

Instead of drawing the cultivator by a horse, it may be moved along the rows by the attendant, as the speed of a horse may be too rapid to allow the operator to select such plants as he desires to leave standing, and to guide the machine to that end.

Having thus fully described the nature of my invention, what I claim therein as new, and desire to secure by Letters Patent, is—

In combination with the hoes E E, having both a vertical and lateral adjustment, the shoes H H above them, and so adjustable on or with said hoes as to serve to throw the earth toward or from the plants, as may be required, the whole being for the purposes herein set forth and explained.

JOSEPH SHAW.

Witnesses:
 JOHN WOOLLY,
 JAMES WEBB.